United States Patent [19]
Shimizu et al.

[11] 4,428,984
[45] Jan. 31, 1984

[54] METHOD OF PREVENTING DUSTS

[75] Inventors: Hirozumi Shimizu, Yokohama; Noboru Kiso, Osaka; Taizo Igarashi, Amagasaki, all of Japan

[73] Assignee: Nippon Oil and Fats Co., Japan

[21] Appl. No.: 387,367

[22] Filed: Jun. 11, 1982

Related U.S. Application Data

[63] Continuation of Ser. No. 202,875, Oct. 31, 1980, abandoned.

[30] Foreign Application Priority Data

Nov. 7, 1979 [JP] Japan .................. 54-143200

[51] Int. Cl.³ .................................... C09K 3/22
[52] U.S. Cl. ........................... 427/220; 252/88; 44/6; 427/212
[58] Field of Search ............... 44/6; 427/212, 220, 427/215; 252/88

[56] References Cited

U.S. PATENT DOCUMENTS

| 1,995,598 | 3/1935 | Archbald | 44/6 |
| 3,926,060 | 12/1975 | Smith | 106/309 |
| 4,316,811 | 2/1982 | Burns | 427/220 |

FOREIGN PATENT DOCUMENTS

| 675230 | 12/1963 | Canada | 427/212 |
| 1946168 | 3/1971 | Fed. Rep. of Germany | 44/6 |
| 48-40491 | 7/1973 | Japan | 252/88 |
| 716539 | 10/1950 | United Kingdom | 252/88 |
| 677279 | 8/1952 | United Kingdom | 252/88 |

OTHER PUBLICATIONS

Shick, "Nonionic Surfactants," vol. 2, pp. 80-82.

Primary Examiner—Sam Silverberg
Attorney, Agent, or Firm—Parkhurst & Oliff

[57] ABSTRACT

Dusts can be effectively prevented by spreading an aqueous solution containing both nonionic surface active agent and polyhydric alcohol on the substances which develop dusts.

13 Claims, No Drawings

METHOD OF PREVENTING DUSTS

This is a continuation of application Ser. No. 202,875 filed Oct. 31, 1980, now abandoned.

BACKGROUND OF THE INVENTION

(1) Field of the Invention

The present invention relates to a method of preventing dusts, such as coal powder, ore powder, fly ash, sand and the like.

(2) Description of the Prior Art

Dusts are apt to be developed during the transportation of coal, ore, fly ash, sand and the like, or at the place of storing these substances to pollute the environment.

In order to prevent dusts, water or an aqueous solution of a surface active agent is spread on the substances which develop dusts. However, water is evaporated with the lapse of time, and dusts develop again.

The inventors have made various investigations in order to prevent dusts and found out a method capable of preventing dusts for a long period of time.

SUMMARY OF THE INVENTION

The feature of the present invention consists in a method of preventing dusts, comprising spreading an aqueous solution containing both a nonionic surface active agent and a polyhydric alcohol on the substances which develop dusts.

DESCRIPTION OF THE PREFERRED EMBODIMENT

As the nonionic surface active agent to be used in the present invention, there can be used polyoxyethylene alkyl ether, polyoxyethylene alkylphenyl ether, polyoxyethylene fatty acid ester, polyoxyethylene polyhydric alcohol fatty acid ester, polyoxyethylene alkyl amine, polyoxyethylene fatty acid amide, polyhydric alcohol fatty acid ester and the like. These nonionic surface active agents can be used in combination with anionic surface active agents, such as alkyl aryl sulfonate, dialkyl sulfosuccinate, alkyl methyl taurate, fatty acid salt and the like; cationic surface active agents, such as quaternary ammonium salts, quaternary phosphonium salts and the like; and amphoteric surface active agents, such as alkyl betaine, alkyl glycine and the like.

Among the nonionic surface active agents, polyoxyethylene nonionic surface active agents are effective, and particularly ones obtained by adding 6–20 moles of ethylene oxide to one mole of fatty acid, alcohol, amine or fatty acid amide having 10–22 carbon atoms, and ones obtained by adding 6–20 moles of ethylene oxide to one mole of alkylphenol having an alkyl group having 8–18 carbon atoms are preferable.

As the polyhydric alcohol to be used in the present invention, there can be used water-soluble polyhydric alcohols, such as ethylene glycol, propylene glycol, glycerine, trimethylolpropane, pentaerythritol, sorbitol, sorbitan, polyethylene glycol, polypropylene glycol, polyglycerine, sugar and the like.

These nonionic surface active agents and polyhydric alcohols are spread in the form of an aqueous solution containing 0.001–10% by weight, preferably 0.01–1% by weight, of each of the compounds on the substances which develop dusts.

The nonionic surface active agent and the polyhydric alcohol can be spread in the form of separate aqueous solutions containing each of these compounds, but it is more advantageous and more effective to spread these compounds in the form of an aqueous solution containing both the compounds.

According to the method of the present invention, the nonionic surface active agent and the polyhydric alcohol exhibit their effect for a period of time remarkably longer than that achieved by use of the nonionic surface active agent or the polyhydric alcohol alone, and dusts can be prevented for a long period of time.

According to the method of the present invention, development of dusts is effectively prevented, and therefore the environment of the place which stores coal powder, ore powder, fly ash, sand and the like, and that of the operation site, which handles these substances, can be remarkably improved.

The following examples are given for the purpose of illustration of this invention and are not intended as limitations thereof. In the examples, "%" means % by weight.

EXAMPLE 1

Sample aqueous solutions shown in Table 1, below, were produced by the use of various nonionic surface active agents and polyhydric alcohols. The sample aqueous solutions were spread on coal powder and a test for dust prevention was effected in the following manner.

Bituminous coal (Blair Athor Coal) powder containing at least 70% of particles having a size of not larger than 3 mm was stacked in a height of about 20 cm on an aluminum square vat having a side of 45 cm and a depth of 2 cm. Then, 600 ml of the above described sample aqueous solutions were spread on the bituminous coal powder by means of a sprayer. In the above experiments, the amount of the bituminous coal powder was about 17 kg, and the spread amount of the sample aqueous solutions was about 3 l/m$^2$.

After the above treated bituminous coal powder was left to stand for a given period of days, the coal powder was subjected to a scattering test by blowing air in the following manner.

The vat having the above described bituminous coal powder stacked therein was placed in a wind tunnel, and air was blown into the wind tunnel at a rate of 8 m/sec or 13 m/sec for 3 minutes, and the weight of the scattered coal powder was measured. The obtained results are shown in Table 1. It can be seen from Table 1 that the method of the present invention, wherein nonionic surface active agent is used in combination with polyhydric alcohol, is superior to the use of nonionic surface active agent or polyhydric alcohol alone.

TABLE 1

Scattering test for coal powder by blowing air
(Scattered amount: g)

| No. | Concentration of sample aqueous solution | (%) | Wind velocity: 8 m/sec After 1 day | Wind velocity: 8 m/sec After 3 days | Wind velocity: 8 m/sec After 7 days | Wind velocity: 13 m/sec After 1 day | Wind velocity: 13 m/sec After 3 days | Wind velocity: 13 m/sec After 7 days |
|---|---|---|---|---|---|---|---|---|
| 1 | Water only | | 2,000 | 3,000 | 3,000 | 7,000 | 8,000 | 9,000 |
| 2 | Polyoxyethylene(10) nonylphenyl ether | 0.5 | 0 | 20 | 100 | 15 | 800 | 2,000 |
| 3 | Glycerine | 0.5 | 100 | 130 | 150 | 100 | 500 | 1,500 |
| 4 | Polyoxyethylene(10) nonylphenyl ether | 0.05 | 0 | 10 | 20 | 2 | 500 | 2,000 |
|   | Glycerine | 0.05 | | | | | | |
| 5 | Polyoxyethylene(10) nonylphenyl ether | 0.25 | 0 | 0 | 10 | 0 | 15 | 80 |
|   | Glycerine | 0.25 | | | | | | |
| 6 | Polyoxyethylene(12) dodecyl ether | 0.5 | 0 | 40 | 150 | 30 | 1,000 | 2,500 |
| 7 | Sorbitol | 0.5 | 100 | 100 | 150 | 100 | 1,000 | 2,500 |
| 8 | Polyoxyethylene(12) dodecyl ether | 0.05 | 0 | 20 | 30 | 10 | 600 | 2,500 |
|   | Sorbitol | 0.05 | | | | | | |
| 9 | Polyoxyethylene(12) dodecyl ether | 0.25 | 0 | 0 | 15 | 10 | 20 | 100 |
|   | Sorbitol | 0.25 | | | | | | |
| 10 | Polyoxyethylene(15) monooleate | 0.5 | 0 | 35 | 160 | 95 | 500 | 2,400 |
| 11 | Polyethylene glycol (molecular weight 400) | 0.5 | 100 | 120 | 170 | 100 | 600 | 2,900 |
| 12 | Polyoxyethylene(15) monooleate | 0.05 | 0 | 25 | 40 | 20 | 600 | 2,500 |
|    | Polyethylene glycol (molecular weight 400) | 0.05 | | | | | | |
| 13 | Polyoxyethylene(15) monooleate | 0.25 | 0 | 10 | 25 | 5 | 40 | 200 |
|    | Polyethylene glycol (molecular weight 400) | 0.25 | | | | | | |
| 14 | Sorbitan monooleate | 0.5 | 5 | 60 | 190 | 110 | 550 | 2,200 |
| 15 | Ethylene glycol | 0.5 | 85 | 120 | 180 | 200 | 1,000 | 2,200 |
| 16 | Sorbitan monooleate | 0.25 | 10 | 40 | 150 | 120 | 140 | 230 |
|    | Ethylene glycol | 0.25 | | | | | | |

Note:
The numeral in the parentheses means the number of added moles of ethylene oxide

EXAMPLE 2

The effect of the present invention on the prevention of dusts during the transportation of coal powder was examined.

On a belt conveyor having a length of 10 m and a width of 50 cm, which had been placed at a height of 2 m, was stacked uniformly 100 kg of the same bituminous coal powder as used in Example 1, and 10 l of each of sample aqueous solutions No. 1-No. 5 of Example 1 was spread on the bituminous coal powder. Then, the belt conveyor was moved at a rate of 10 m per minute to drop the coal powder, and the development of dusts was observed. The obtained results are shown in the following Table 2. It can be seen from Table 2 that the method of the present invention, wherein a nonionic surface active agent is used in combination with polyhydric alcohol, is remarkably effective for preventing dusts.

TABLE 2

Dust-developing test by a belt conveyer

| No. | Concentration of sample aqueous solution | (%) | Development of dusts |
|---|---|---|---|
| 1 | Water only | | A large amount of dust is developed. Whole of the working place becomes deep black. |
| 2 | Polyoxyethylene(10) nonylphenyl ether | 0.5 | A small amount of dust is developed. When wind velocity is high, a large amount of dust is developed. |
| 3 | Glycerine | 0.5 | A somewhat large amount of dust is developed. |
| 4 | Polyoxyethylene(10) nonylphenyl ether | 0.05 | A small amount of dust is developed. |
|   | Glycerine | 0.05 | When wind velocity is high, dust is developed. |
| 5 | Polyoxyethylene(10) nonylphenyl ether | 0.25 | Substantially no dust is developed. |
|   | Glycerine | 0.25 | Even when wind velocity is high, a small amount of dust is developed. |

What is claimed is:

1. A method of preventing dust comprising spreading an aqueous solution consisting essentially of water and 0.01-10% by weight of each of a nonionic surface active agent and a polyhydric alcohol on the substances which develop dust, said nonionic surface active agent being selected from polyoxyethylene alkyl ether, polyoxyethylene alkylphenyl ether and polyoxyethylene fatty acid ester, and said polyhydric alcohol being selected from ethylene glycol, glycerine, sorbitol and polyethylene glycol.

2. A method according to claim 1, wherein said nonionic surface active agent is a polyoxyethylene alkyl ether.

3. A method according to claim 2, wherein said polyoxyethylene alkyl ether is polyoxyethylene (12 moles) dodecyl ether.

4. A method according to claim 1, wherein said nonionic surface active agent is a polyoxyethylene alkylphenyl ether.

5. A method according to claim 4, wherein said polyoxyethylene alkylphenyl ether is polyoxyethylene (10 moles) nonylphenyl ether.

6. A method according to claim 1, wherein said nonionic surface active agent is a polyoxyethylene fatty acid ester.

7. A method according to claim 6, wherein said polyoxyethylene fatty acid ester is polyoxyethylene (15 moles) monooleate.

8. A method according to claim 1, wherein said polyhydric alcohol is ethylene glycol.

9. A method according to claim 1, wherein said polyhydric alcohol is glycerine.

10. A method according to claim 1, wherein said polyhydric alcohol is sorbitol.

11. A method according to claim 1, wherein said polyhydric alcohol is polyethylene glycol.

12. A method according to claim 1, wherein said aqueous solution consists essentially of water and no more than 0.25% by weight of each of said nonionic surface active agent and polyhydric alcohol.

13. A method according to claim 1, wherein said aqueous solution consists essentially of water and 0.05% by weight of each of said nonionic surface active agent and polyhydric alcohol.

* * * * *